United States Patent [19]

Takayama et al.

[11] Patent Number: 5,296,976

[45] Date of Patent: Mar. 22, 1994

[54] MAGNETIC RECORDING/REPRODUCING DEVICE

[75] Inventors: Jun Takayama, Tokyo; Kiyoshi Sawakata; Kozo Kaminaga, both of Kanagawa; Seiichi Sakai, Tokyo, all of Japan

[73] Assignee: Sony Corporation, Tokyo, Japan

[21] Appl. No.: 765,380

[22] Filed: Sep. 25, 1991

[30] Foreign Application Priority Data

Jun. 28, 1991 [JP] Japan ................... 3-185482

[51] Int. Cl.$^5$ ............................................. G11B 5/02
[52] U.S. Cl. ............................... 360/57; 360/77.15
[58] Field of Search .................... 360/57, 77.14, 77.15, 360/77.16, 77.12, 77.13, 10.3, 19.1, 21, 72.2, 72.3, 27, 18, 61, 74.4

[56] References Cited

U.S. PATENT DOCUMENTS 3,829,892  8/1974  Nagahiro et al. ............... 360/73.01
4,999,722  3/1991  Kozuki et al. .................. 360/77.15

*Primary Examiner*—Robert J. Pascal
*Assistant Examiner*—Ali Neyzari
*Attorney, Agent, or Firm*—Hill, Steadman & Simpson

[57] ABSTRACT

A magnetic recording/reproducing device for recording/reproducing information signals for one recording unit over a plurality of recording tracks by helically scanning a magnetic tape with rotary heads. The information signals for one recording unit are recorded on the plurality of recording tracks on the magnetic tape, and guard bands are formed simultaneously between the one recording units. The recording density is substantially improved. Erase heads overwrite the information signals on the magnetic tape and the plurality of recording tracks for one recording unit on the magnetic tape are erased en block, which prevents over-erasing unerased portions during editing.

2 Claims, 7 Drawing Sheets

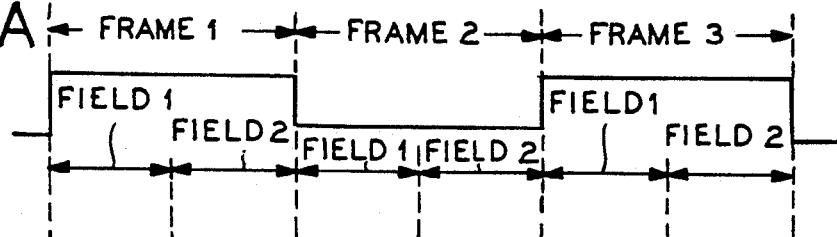
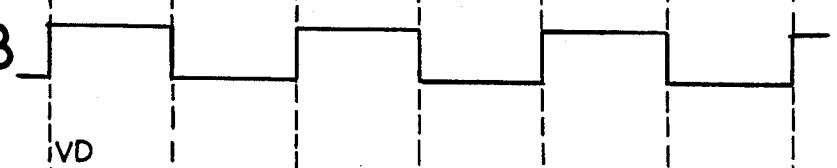
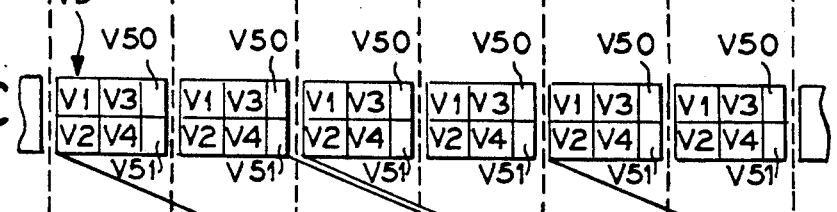
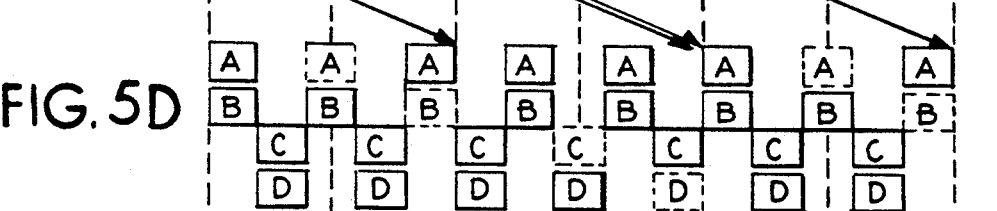
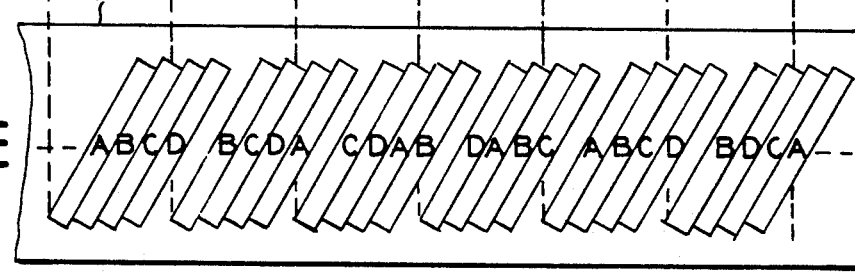

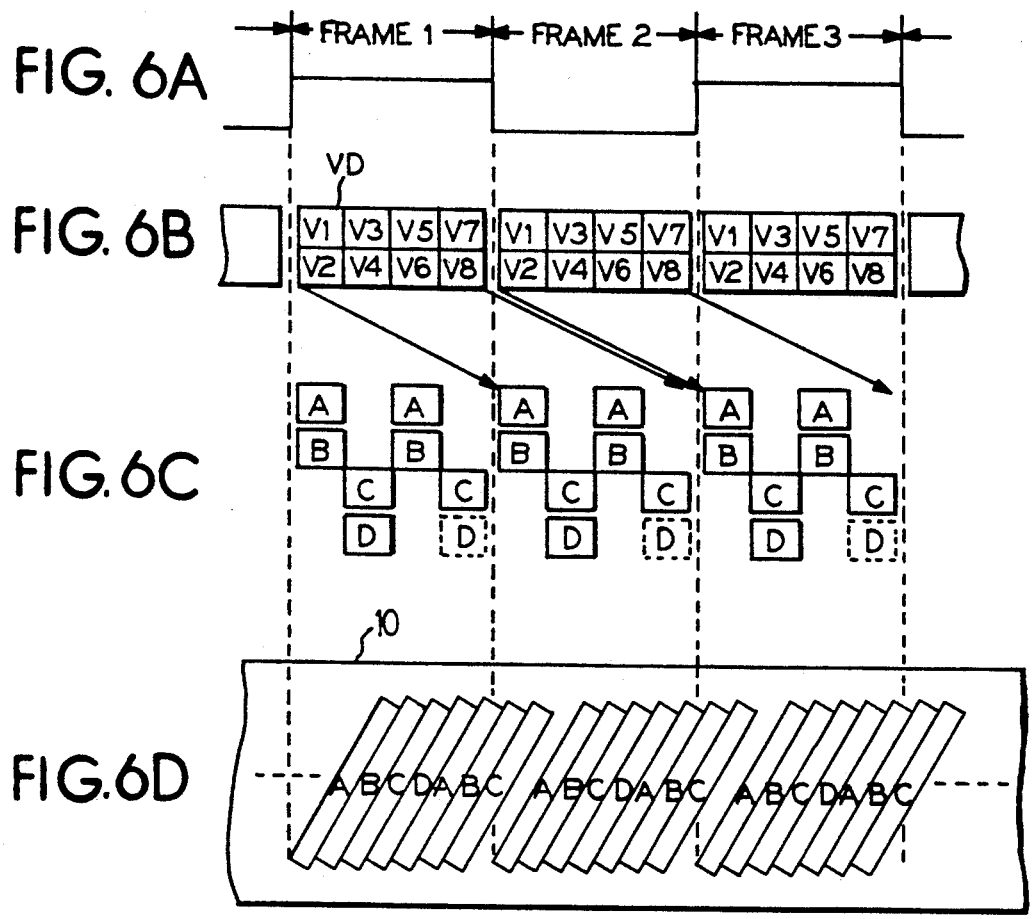

MAGNETIC RECORDING/REPRODUCING DEVICE

BACKGROUND OF THE INVENTION

1. Field of the Invention

The present invention relates to a magnetic recording/reproducing device and suitable particularly for an application to a device for recording and reproducing desired information signals by helically scanning a magnetic tape with rotary heads.

2. Description of the Prior Art

A conventional magnetic recording/reproducing device, has a digital video tape recorder for helically scanning a magnetic tape with rotary heads and thereby effecting record/reproduction of information signals consisting of, e.g., digital video signals on and from recording tracks formed obliquely to a traveling direction of the magnetic tape.

This type of digital video tape recorder includes a D-1 format digital video tape recorder, based on so-called SMPTE (American Movie & Television Engineer Association) standards, for recording and reproducing component digital video signals and also a D-2 format digital video tape recorder, based on the SMPTE standards, for recording and reproducing composite digital video signals. Both of the devices record the video signals for one field over the plurality of recording tracks.

A so-called guard band recording is adopted in the D-1 format digital video tape recorder. As illustrated in FIG. 7(A), the digital video signals are recorded on a magnetic tape 1 in format in which guard bands GB are interposed between respective recording tracks T11, T12, T13, T14, T15, T16, . . . , T1N.

So-called azimuth solid recording is adopted in the D-2 format digital video tape recorder. As illustrated in FIG. 7(B), the digital video signals are recorded on recording tracks T21, T22, T23, T24, T25, T26, . . . , T2N having sequentially alternately different azimuths on the magnetic tape 1.

The recording tracks T1N based on the D-1 format shown in FIG. 7(A) are formed in the direction inclined to the traveling direction of the magnetic tape 1 with the guard bands GB being interposed between the respective tracks. Digital audio signals AD for 4 channels are recorded on the central parts thereof, while digital video signals VD1, VD2 are recorded on upper and lower parts thereof. Note that in the case of the D-1 format, the digital video signals VD1, VD2 for one field are recorded on, e.g., 10 or 12 pieces of the recording tracks T1N.

The recording tracks T2N based on the D-2 format shown in FIG. 7(B) are formed in the direction inclined to the traveling direction of the magnetic tape 1 having sequentially different azimuths. The digital video signals VD are recorded on the central parts thereof. Digital video audio signals A1, A2, A3, A4 for 4 channels are recorded on upper and lower parts thereof by a double recording method. Note that in the case of the D-2 format, the digital video signals VD for one field are recorded on, e.g., six pieces of recording tracks T2N.

In the digital video tape recorders described above, if track pitches of the recording tracks are narrowed to improve the recording density, the efficiency is poor corresponding to the existence of the guard bands in the D-1 format guard band record. This results in a problem in that the track pitch is widened.

The D-2 format digital video tape recorder adopts the azimuth solid recording using no guard band and is therefore considered to be fundamentally suitable for ameliorating the recording density by narrowing the track pitches of the recording tracks.

When the track pitches of the recording tracks are further narrowed, however, and if a tracking error is caused on the occasion of effecting an editing process by overwriting, as depicted in FIG. 8, an old recording track T24 having an equiphase azimuth contain some unerased portions at this overwrite starting part T21N. A problem is thereby caused, wherein the S/N ratio is deteriorated, and the error rate during the reproduction deteriorates so as to cause a decline of image quality.

As depicted in FIG. 9, if the tracking error is produced when only one-channel information of the digital audio signals is to be replaced, the same problem occurs. Some unerased portions of the old recording tracks A1 having the equiphase azimuth exist for of digital audio signal A1N which are to be replaced, resulting in noises.

For eliminating the remainder of such old recording tracks T24, A1 having the equiphase azimuth, the old recording tracks T24, A1 can be erased in advance of the overwrite recording by use of a flying erase head.

In this case, however, if a head width of the flying erase head is selectively set to a value which is narrower than a track width of the recording track, a problem occurs because the old recording tracks having equiphase are left on both sides. Whereas if set to a value wider than the track width of the recording track, the two necessary adjacent recording tracks are erased, making it difficult to form the guard band. This is not acceptable in actual equipment.

SUMMARY OF THE INVENTION

The present invention solves the above-discussed problems by proposing a magnetic recording/reproducing device capable of remarkably improving the recording density over the prior art.

To solve the above listed problems, according to the invention, there is provided a magnetic recording/reproducing device for recording and reproducing desired information signals VD on and from a magnetic tape 10 by helically scanning the magnetic tape 10 with rotary heads HA, HB1, HC1, HD1, characterized in that the information signals VD for one recording unit F are recorded over a plurality of recording tracks T1, T2, T3, T4, T5, T6 on the magnetic tape 10, and guard bands GB0, GB1, GB2, GB3 are formed between the one recording units F each consisting of the plurality of recording tracks T1, T2, T3, T4, T5, T6 on the magnetic tape 10.

Provided according to a second embodiment of the invention are erase heads FE1, FE2 for erasing en bloc, when overwriting the information signals VD on the magnetic tape 10, the plurality of recording tracks T1, T2, T3, T4, T5, T6 for the one recording unit F on the magnetic tape 10.

The information signals VD for one recording unit F are recorded over the plurality of recording tracks T1, T2, T3, T4, T5, T6 on the magnetic tape 10. Simultaneously, the guard bands GB0, GB1, GB2, GB3 are formed between the one recording units F. The recording density is substantially improved over conventional construction in which the guard bands are formed for every track. Further, when the erase heads FE1, FE2 overwrite the information signals VD on the magnetic tape 10, the plurality of recording tracks T1, T2, T3, T4, T5, T6 for one recording unit F on the magnetic tape 10 are erased en bloc. It is therefore possible to prevent occurrences of over-erasing and unerased portions during the editing process based on the azimuth solid recording.

BRIEF DESCRIPTION OF THE DRAWINGS

FIGS. 5A-5E are schematic diagrams for explaining the formation of the guard band in accordance with the second embodiment;

FIGS. 6A-6D are schematic diagrams for explaining the formation of the guard ban din accordance with a third embodiment;

DESCRIPTION OF THE PREFERRED EMBODIMENTS

One embodiment of the present invention will hereinafter be described with reference to the drawings.

Format of the Recording Tracks

Figure 1:
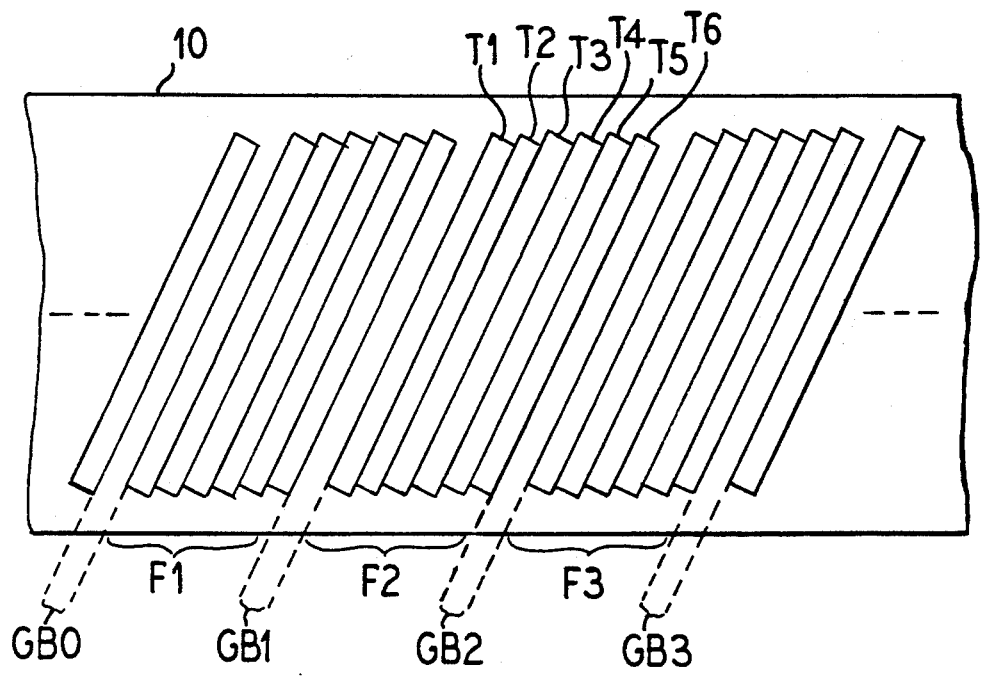
FIG. 1 is a schematic diagram showing an embodiment of a recording format on a magnetic tape which is used for a magnetic recording/reproducing device according to the present invention.

Designated generally at 10 in FIG. 1 is a magnetic tape having a format of recording tracks according to the present invention, wherein, e.g., one-field digital video signals as one-recording unit are recorded on six recording tracks T1, T2, T3, T4, T5, T6 based on an azimuth solid recording using no guard band.

In this embodiment, guard bands GB0, GB1, GB2, GB3 . . . each having a predetermined band width are formed between digital video signal fields F1, F2, F3 . . . each consisting of the six recording tracks T1, T2, T3, T4, T5, T6. As a matter of fact, the band width of the guard band GBN is selectively set to a value larger than the amount of deviation of the rotary head due to a tracking error during an editing process.

The guard bands are formed in accordance with the field units F in this manner. It is therefore possible to reduce the guard bands between the respective recording tracks which are prescribed by a D-1 format digital video tape recorder down to one guard band for one field F. Track pitches of the recording tracks TN are narrowed correspondingly, whereby the digital video signals are recorded with a high density.

Unerased old recording tracks having equiphase azimuths are erased when narrowing the track pitches of the recording racks in a D-2 format digital video tape recorder by use of a flying erase head. The track pitches of the recording tracks TN are narrowed correspondingly, whereby the digital video signals are recorded with a high density.

Figure 2:
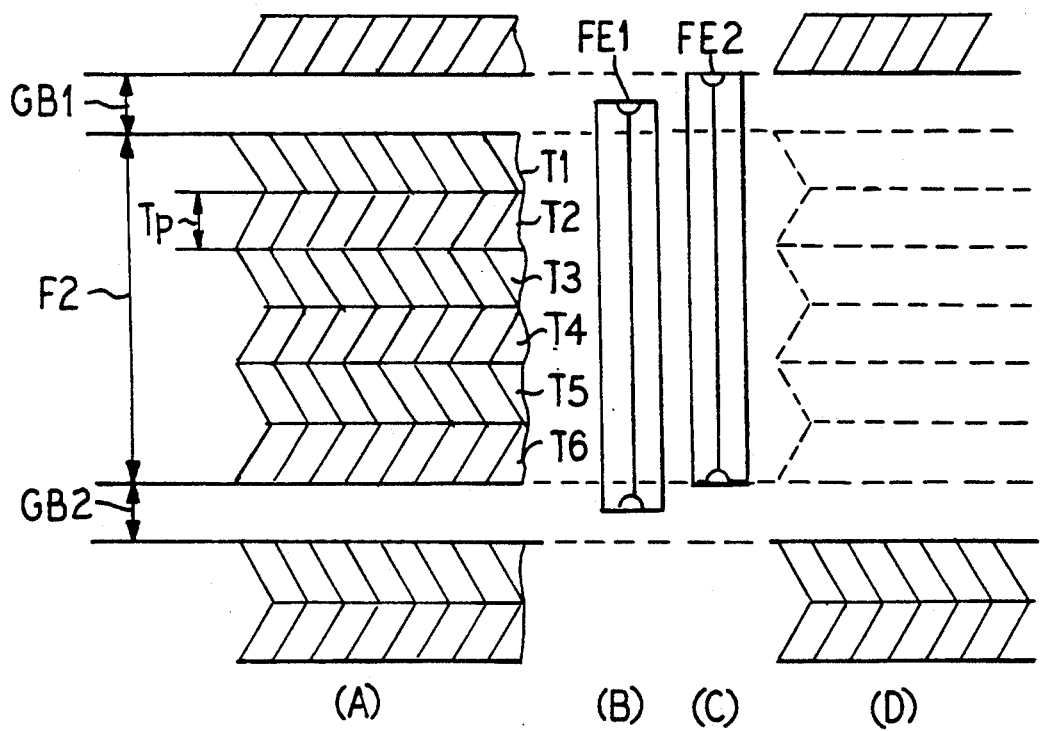
FIGS. 2A-2D are schematic diagrams for explaining an erase by a flying erase head in the recording format on that magnetic tape.

In the case of this embodiment, a head width of a flying erase head FE is, as illustrated in FIG. 2(A) which is, selectively set to a value obtained by adding the band widths of the guard bands GB to the track pitches TP of the six recording tracks TN constituting one field F.

Even in a case such that the flying erase head FE1 is in a just tracking state (FIG. 2(B)) and in a tracking error state (FIG. 2(C)), the old recording tracks having the equiphase azimuths will be erased by erasing the six recording tracks TN constituting one field F as shown in FIG. 2(C).

In this way, the digital video signals for one field F are recorded by an azimuth solid recording on the plurality of recording tracks T1, T2, T3, T4, T5, T6 of the magnetic tape 10. Simultaneously, the guard bands GB are formed for every one field F. The recording density is thereby improved over the conventional D-1 format where the guard bands are formed for every one recording track. When overwriting the recording tracks on the magnetic tape 10, the recording tracks T1, T2, T3, T4, T5, T6 for one field F are erased en bloc. It is thus possible to attain the recording track format capable of preventing occurrences of overerasing and the unerased portions as seen in the conventional D-2 format during the editing process by the azimuth recording solid recording.

Magnetic Recording/Reproducing Device in the First Embodiment

FIGS. 3A-3D generally show a first embodiment of the present invention. One field of the digital video signals is divided into 4 sections. The present invention is applied to a magnetic recording/reproducing device in which four pieces of rotary heads HA, HB, HC, HD disposed on a drum make one rotations, and the digital video signals are thereby azimuth-solid-recorded and reproduced. In effect, the rotary heads HA, HB, HC, HD are placed with predetermined deviations in height. With this arrangement, the guard band for one recording track is formed in accordance with one field unit on the magnetic tape 10.

Figure 3A:
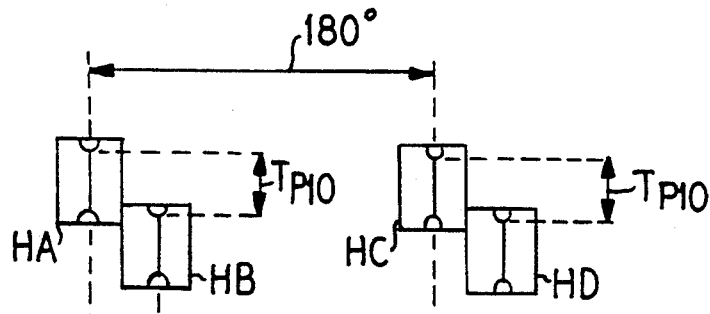
FIGS. 3A-3D are schematic diagrams for explaining formation of the guard bands in accordance with the first embodiment.
Figure 3B:
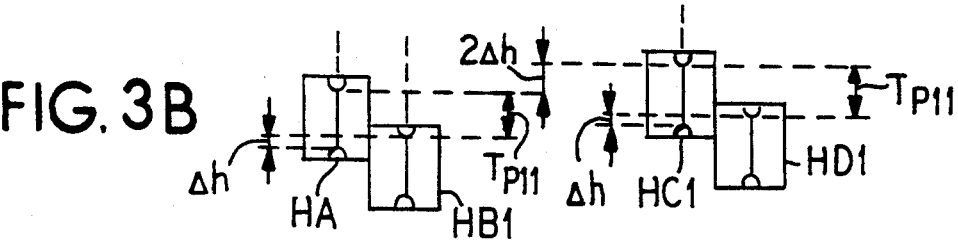

More specifically, in this magnetic recording/reproducing device, typically as illustrated in FIG. 3(A), the two rotary heads HA, HC each having the same azimuth angle are disposed opposite to each other at 180° on the drum. Further, the two rotary heads HB, HD each having an azimuth angle different from that of the rotary heads HA, HC are disposed in positions which deviate in height corresponding to the track pitches TP in rear of the rotary heads HA, HC.

Figure 3C:
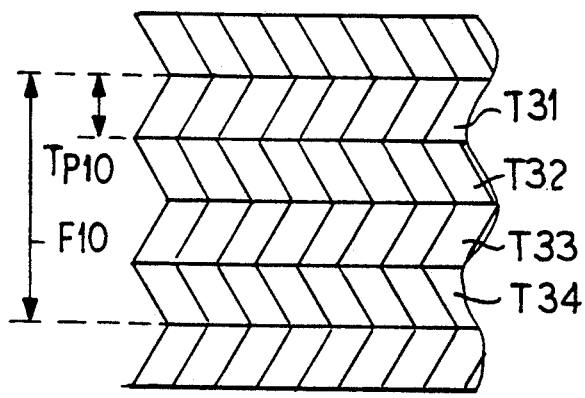
Figure 3D:
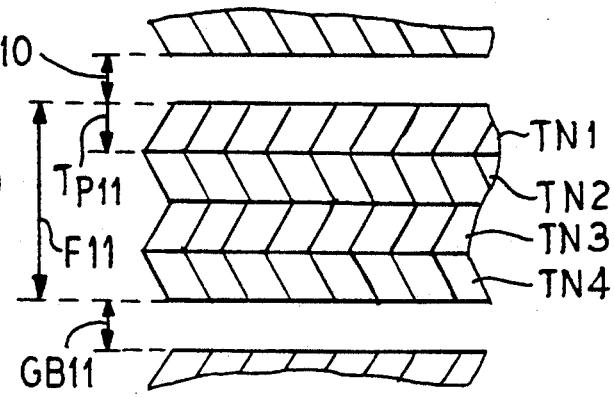

The digital video signals for one field F10 are recorded with one rotation of the rotary heads HA, HB, HC, HD. As depicted in FIG. 3(C), recording tracks T31, T32, T33, T34 each having the track pitch TP10 are sequentially formed on the magnetic tape.

In the magnetic recording/reproducing device according to this embodiment, rotary heads HB1, HC1, HD1 are disposed in positions higher by $\Delta h$, $2\Delta h$, $3\Delta h$ than the rotary heads HB, HC, HD in comparison with typical head placements of the rotary heads HA, HB, HC, HD shown in FIG. 3(A).

The track pitch of one recording track is thereby narrowed from the track pitch TP10 to a track pitch TP11. As a result of this, the digital video signals for one field F11 are recorded with one rotation of the rotary heads HA, HB1, HC1, HD1. As illustrated in FIG. 3(C), recording tracks TN1, TN2, TN3, TN4 each having the track pitch TP11 are sequentially formed on the magnetic tape, and subsequently a guard band GB11 can be formed.

Based on the configuration described above, the rotary heads HB1, HC1, HD1 are disposed with positional deviations higher by Δh, 2Δh, 3Δh than the placement of the rotary heads HA, HB, HC, HD of the recording-/reproducing device for effecting the azimuth solid recording. The track pitches TP1 of the recording tracks TN1, TN2, TN3, TN4 are narrowed and have a simple arrangement. It is possible to attain the magnetic recording/reproducing device in which the guard bands GB10, GB11 can be formed for every one field F11, i.e., every four recording tracks TN1, TN2, TN3, TN4.

Magnetic Recording/Reproducing Device of the Second Embodiment

Figure 4:
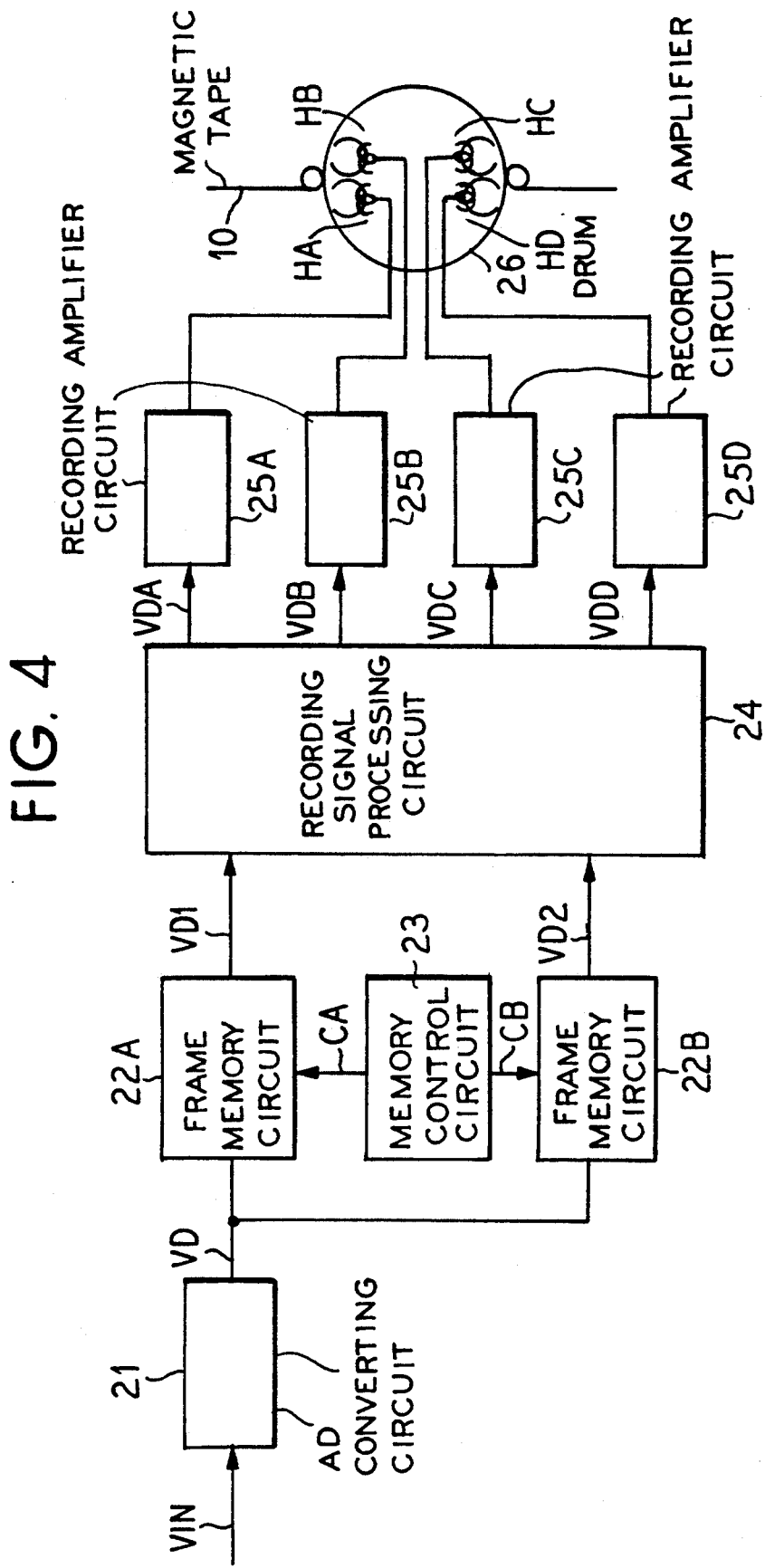
FIG. 4 is a block diagram illustrating a magnetic recording/reproducing device of a second embodiment.
Figure 7A:
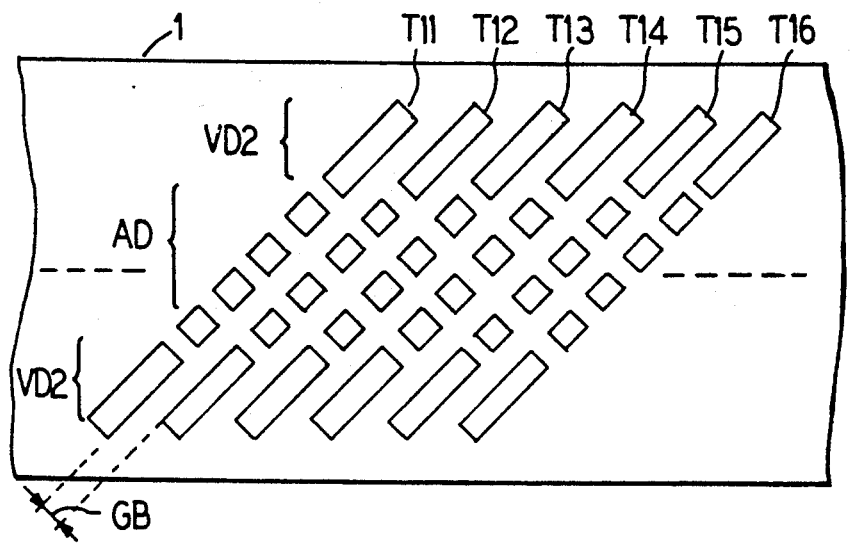
FIGS. 7A-7B are schematic diagrams for explaining a conventional recording format of a digital video tape recorder.
Figure 7B:
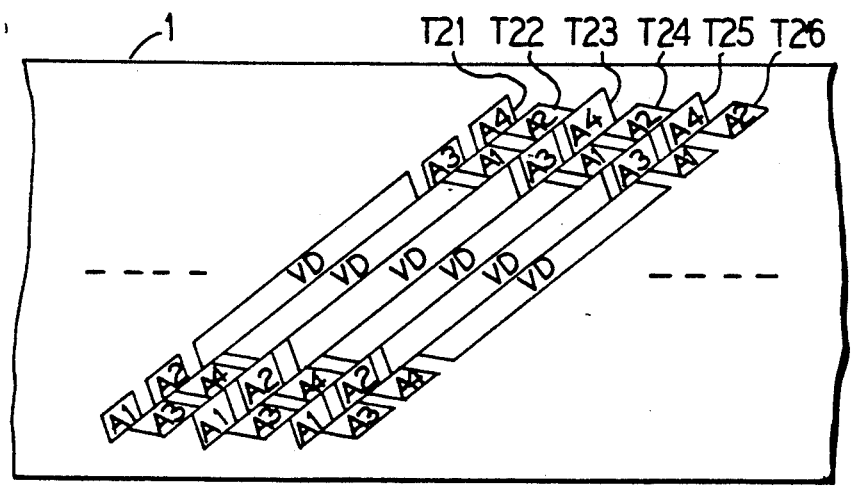
Figure 8:
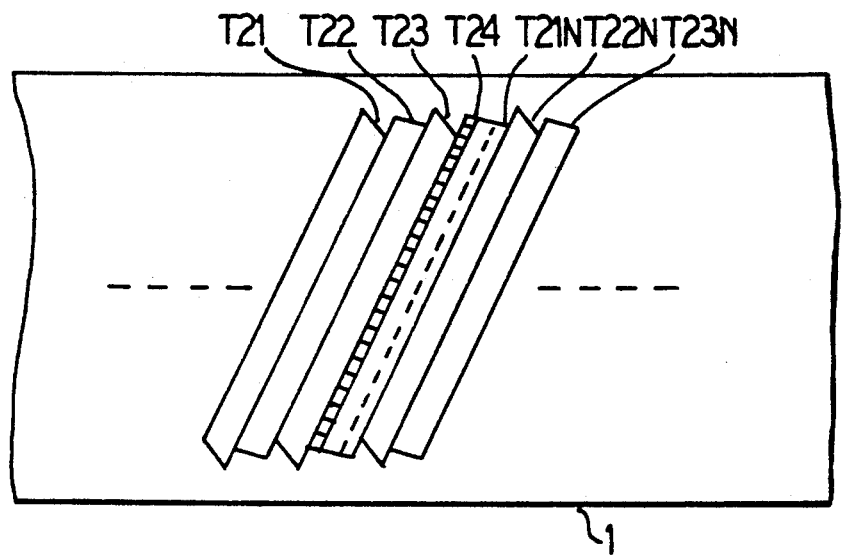
FIG. 8 is a schematic diagram for explaining overwriting in the prior art.
Figure 9:
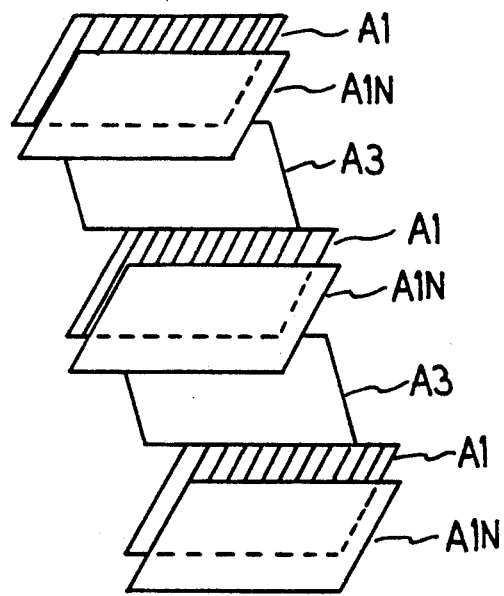
FIG. 9 is a schematic diagram for explaining a rewriting process of conventional audio signals.

FIG. 4 generally illustrates a recording system of a magnetic recording/reproducing device 20 of a second embodiment of this invention. One field of the digital video signals which are to be inputted is divided by a predetermined dividing number and at the same time compressed using data compression procedures. Any one of the four rotary heads HA, HB, HC, HD disposed on the drum is sequentially rested, thereby forming the guard bands for every one field.

In this magnetic recording/reproducing device 20, video signals VIN which are inputted undergo an analog-to-digital conversion with an analog digital converting circuit. Digital video signals VD obtained as a result are inputted to frame memory circuits 22A, 22B each consisting of two field memories.

The frame memory circuits 22A, 22B operate as so-called double-buffer memories. Based on control signals CA, CB inputted from a memory control circuit 23, the digital video signals VD are sequentially and alternately taken in according to the frame unit and at the same time transmitted are sequentially and alternately according to the frame unit.

In the case of the magnetic recording/reproducing device 20, the digital video signals VD received from the frame memory circuits 22A, 22B are compressed on one field unit with predetermined data compression procedures. The compressed signals are transmitted as record digital video signals VD1, VD2 to a subsequent recording signal processing circuit 24.

The recording signal processing circuit 24 performs modulations with respect to the digital video signals VD1, VD2 with a predetermined modulation method such as adding an error correction code. The signals are allocated for 4 channels to generate record digital video signals VDA, VDB, VDC, VDD which are then supplied to the rotary head HA, HB, HC, HD disposed on the drum 26 via recording amplifier circuits 25A, 25B, 25C, 25D.

In the case of this embodiment, during an extra period after being compressed on the field unit, the control is effected so as not to supply the record digital video signals VDA, VDB, VDC, VDD to any one of the rotary heads HA, HB, HC, HD. Any one of the rotary heads HA, HB, HC or HD is rested or inactive. The guard bands per field are thereby formed on the magnetic tape 10.

In the construction given above, the digital video signals VD inputted are received in the frame memory circuit 22A during periods of odd-numbered frames 1, 3, . . . on the basis of frame pulses shown in FIG. 5(A). During periods of subsequent even-numbered frames 2, 4, . . . , the signals are transmitted to the recording signal processing circuit 24.

Similarly, the digital video signals VD are received, by the frame memory circuit 22B during the periods of the even-numbered frames 2, 4, . . . During the periods of the odd-numbered frames 3, 5, . . . , the signals are transmitted to the recording signal processing circuit 24.

In the case of this embodiment, the digital video signals VD of the odd-numbered frame 1 which have been stored in the frame memory circuit 22A include digital video signals V1, V2, V3, V4, V50, V51 corresponding to, e.g., five recording tracks for every one field consisting, as illustrated in FIG. 5(C), of a field 1 and a field 2. Those signals are compressed down to 4/5 in accordance with the data compression procedures.

The recording signal processing circuit 24 thereby supplies the rotary heads HC, HD, HA, HB with the digital video signals VD1 of the field 1 in the form of the record digital video signals VDC, VDD, VDA, VDB as shown in FIG. 5(D). Subsequently, the rotary head HC is rested, and thereafter the digital video signals VD1 of the field 2 are supplied to the rotary heads, HD, HA, HB, HC in the form of the record digital video signals VDD, VDA, VDB, VDC.

Similarly, the digital video signals of the even-numbered frame 2 which have been stored in the frame memory circuit 22B include the digital video signals V1, V2, V3, V4, V50, V51 corresponding to the five recording tracks for every one field consisting of the field 1 and the field 2. Those signals are compressed down to 4/5 using data compression procedures.

The recording signal processing circuit 24 thereby supplies the rotary heads HA, HB, HC, HD with the digital video signals VD2 of the field 1 in the form of the record digital video signals VDA, VDB, VDC, VDD as shown in FIG. 5(D). Subsequently, the rotary head HA is rested, and thereafter the digital video signals VD2 of the field 2 are supplied to the rotary heads HB, HC, HD, HA in the form of the record digital video signals VDB, VDC, VDD, VDA.

In this embodiment, the inputted digital video signals VD for one field are compressed down to 4/5 in that manner and transmitted to the four rotary heads HA, HB, HC, HD disposed on a drum 26. Simultaneously, during an extra period available due to the compression, any one of the rotary heads HA, HB, HC, HD is sequentially rested. As illustrated in FIG. 5(E), the digital video signals VD for one field are recorded on the four recording tracks with the guard band for recording tracks being interposed therebetween.

Based on the construction discussed above, the digital video signals VD for one field are compressed down to 4/5. At the same time, the four rotary heads HA, HB, HC, HD disposed on the drum 26 are sequentially rested. It is therefore possible to actualize the magnetic recording/reproducing device 20 capable of forming the guard bands for every one field.

Magnetic Recording/Reproducing Device of the Third Embodiment

FIGS. 6A–6D generally show a third embodiment of this invention. The guard bands are formed for every one frame by means of the magnetic recording/reproducing device 20. The digital video signals VD actually inputted are stored in the frame memory circuit 22A during periods of odd-numbered frames 1, 3, ... on the basis of frame pulses shown in FIG. 6(A). During periods of subsequent even-numbered frames 2, 4, ..., the signals are transmitted to the recording signal processing circuit 24.

Similarly, the digital video signals VD are stored in, the frame memory circuit 22B during the periods of the even-numbered frames 2, 4, ... During the periods of the odd-numbered frames 3, ..., the signals are transmitted to the recording signal processing circuit 24.

In the case of this embodiment, the digital video signals VD for the frame 1 which have been stored in the frame memory circuit 22A include digital video signals V1, V2, V3, V4, V5, V6, V7, V8 corresponding to, e.g., eight recording tracks as illustrated in FIG. 6(B). Those signals are compressed down to 7/8 using data compression procedures.

The recording signal processing circuit 24 thereby supplies the rotary heads HA, HB, HC, HD, HA, HB, HC with the digital video signals VD1 of the odd-numbered frame 1 in the form of the record digital video signals VDA, VDB, VDC, VDD, VDA, VDB, VDC as shown in FIG. 6(C). Subsequently, the rotary head HD is rested.

Similarly, the digital video signals VD2 of the even-numbered frame 2 which have been stored in the frame memory circuit 22B, as illustrated in FIG. 6(B), include the digital video signals V1, V2, V3, V4, V5, V6, V7, V8 corresponding to eight recording tracks. Those signals are compressed down to ⅞ in accordance with the data compression procedures.

The recording signal processing circuit 24 thereby supplies the rotary heads HA, HB, HC, HD, HA, HB, HC with the digital video signals VD2 of the even-numbered frame 2 in the form of the record digital video signals VDA, VDB, VDC, VDD, VDA, VDB, VDC as shown in FIG. 6(C). Subsequently, the rotary head HD is rested.

In the case of this embodiment, the digital video signals VD for one frame are compressed down to ⅞ in that manner and transmitted to the four rotary heads HA, HB, HC, HD disposed on the drum 26. The rotary head HD among the rotary heads HA, HB, HC, HD is rested per rotation. The digital video signals for one frame are, as illustrated in FIG. 6(D), thereby recorded on the seven recording tracks with the guard band for the recording tracks being interposed therebetween.

Based on the construction described above, the digital video signals VD for one frame are compressed down to ⅞. At the same time, the rotary head HD among the four rotary heads HA, HB, HC, HD disposed on the drum 26 is rested per rotation. It is therefore possible to attain the magnetic recording/reproducing device 20 capable of forming the guard bands for every one frame.

Other Embodiments

Listed in the first embodiment described above is the case of the device which records the digital video signals for one field on the four recording tracks by making one rotation of the four rotary heads disposed on the drum. The invention is not limited to embodiment but is applicable to a case of recording the digital video signals on an arbitrary unit such as one field or one frame and the like on N-pieces of recording tracks by making one rotation of N-pieces of rotary heads. Incidentally, in this case, the guard bands can be formed for every N-pieces of recording tracks on the magnetic tape.

Listed in the above-mentioned embodiment is the case of forming the guard bands per recording unit such as one field or one frame or the like. The recording unit is not so limited. The same effects as those of the embodiment given above are attainable by use of a variety of recording units.

Listed in the third embodiment described above is the case where the rotary head HD is rested alternately per rotation. The present invention is, however, applied to the magnetic recording/reproducing device for effecting one-frame record and reproduction with one rotation of, e.g., eight pieces of rotary heads. One-frame recording is effected on seven pieces of recording tracks, whereby the same rotary head can be always rested. With this arrangement, one rotary head is omitted, and the construction can be simplified.

Listed in the above-mentioned embodiment is the case where the present invention is applied to the digital video tape recorder. This invention is not, however so, limited but is suitable for applications to devices such as, e.g., digital audio tape recorders, etc. wherein information signals desired are recorded and reproduced by helically scanning the magnetic tape with the rotary heads.

As discussed above, according to this invention, the information signals for one recording unit are recorded over the plurality of recording tracks on the magnetic tape. The guard band is formed between the one record units. The recording density is thereby substantially improved over conventional constructions wherein the guard bands are formed for every one recording track. When the erase head overwrites the information signals on the magnetic tape, the plurality of recording tracks for one recording unit on the magnetic tape are erased en bloc. It is thus feasible to cause the magnetic recording/reproducing device to prevent the occurrence of over-erasing and unerased portions during the editing process due to the azimuth solid recording.

We claim:

1. A magnetic recording/reproducing device comprising a plurality of rotary heads (HA, HB1, HC1, HD1) mounted so as to scan different tracks on a magnetic tape which passes over a helical drum and wherein a first information is recorded by said plurality of rotary heads on a first plurality of side by side parallel information tracks (T1, T2, T3, T4, T5, T6) on said magnetic tape which do not have spaces therebetween, and guard bands (GBO, GB1, GB2, GB3) are formed between said first plurality of information tracks (T1, T2, T3, T4, T5, T6) and adjacent plurality of second, third and fourth information tracks before and after said first plurality of information tracks.

2. A magnetic recording/reproducing device according to claim 1 including a plurality of erase heads (FE1, FE2) for simultaneously erasing said first information on said first plurality of information tracks when overriding with other information on said first plurality of information tracks.

* * * * *